(12) United States Patent
Lippiatt

(10) Patent No.: US 6,723,266 B1
(45) Date of Patent: Apr. 20, 2004

(54) LINING OF UNDERGROUND PIPES

(75) Inventor: Raymond Lippiatt, Manor Farm, Romsey, Wiltshire SN8 2RG (GB)

(73) Assignees: Raymond Lippiatt (GB); Enterprise Managed Services Limited (GB)

( * ) Notice: Subject to any disclaimer, the term of this patent is extended or adjusted under 35 U.S.C. 154(b) by 0 days.

(21) Appl. No.: 10/295,852

(22) Filed: Nov. 18, 2002

(51) Int. Cl.[7] ............................................... B29C 53/08
(52) U.S. Cl. .................... 264/173.17; 138/97; 264/269; 264/280; 425/133.1; 425/392
(58) Field of Search ................................ 264/269, 516, 264/173.16, 35, 36.16, 280, 294, 173.17; 138/97, 98; 425/133.1, 392, 460

(56) References Cited

U.S. PATENT DOCUMENTS

| | | |
|---|---|---|
| 3,894,328 A | 7/1975 | Jansson |
| 4,064,211 A | 12/1977 | Wood |
| 4,207,130 A | 6/1980 | Barber |
| 4,410,391 A | 10/1983 | Thomas et al. |
| 4,863,365 A | 9/1989 | Ledoux et al. |
| 4,985,196 A | 1/1991 | LeDoux et al. |
| 4,986,951 A | 1/1991 | Ledoux et al. |
| 4,998,871 A | 3/1991 | Ledoux |
| 5,034,180 A | 7/1991 | Steketee, Jr. |
| 5,091,137 A | 2/1992 | Ledoux |
| 5,112,211 A | 5/1992 | LeDoux et al. |
| 5,318,421 A | 6/1994 | Lippiatt |
| 5,399,301 A | 3/1995 | Menendez et al. |
| 5,487,411 A | 1/1996 | Goncalves |
| 5,676,175 A | 10/1997 | Bar et al. |
| 5,810,053 A | 9/1998 | Mandich |
| 5,861,116 A | 1/1999 | Mandich |
| 5,971,029 A | 10/1999 | Smith et al. |
| 6,058,978 A | 5/2000 | Paletta et al. |
| 6,098,665 A | 8/2000 | Grace |
| 6,167,913 B1 | 1/2001 | Wood et al. |
| 6,302,983 B1 | 10/2001 | Agren et al. |

FOREIGN PATENT DOCUMENTS

| | | |
|---|---|---|
| EP | 0 787 940 | 8/1997 |
| GB | 1 580 438 | 12/1980 |
| GB | 2 084 686 | 4/1982 |
| WO | WO 87/03840 | 7/1987 |

*Primary Examiner*—Mathieu D. Vargot
(74) *Attorney, Agent, or Firm*—Stites & Harbison, PLLC; Marvin Petry

(57) ABSTRACT

A method and apparatus for making a pipe liner and the pipe liner itself. A thin walled pipe liner, after being provided cooled from a spool or extruded in tubular form and cooled, is deformed to a smaller cross section at ambient temperature. The pipe liner is then encased and held in its reduced cross section deformed shape by a protective sleeve which is co-extruded directly over the pipe liner. The sleeved pipe liner may then be wound on a drum for transport to a remote location. Ducts for water may pass through the pipe liner. Other ducts, for example, for fiber optics, may pass through the sleeve either within or outside of the deformed pipe liner.

15 Claims, 4 Drawing Sheets

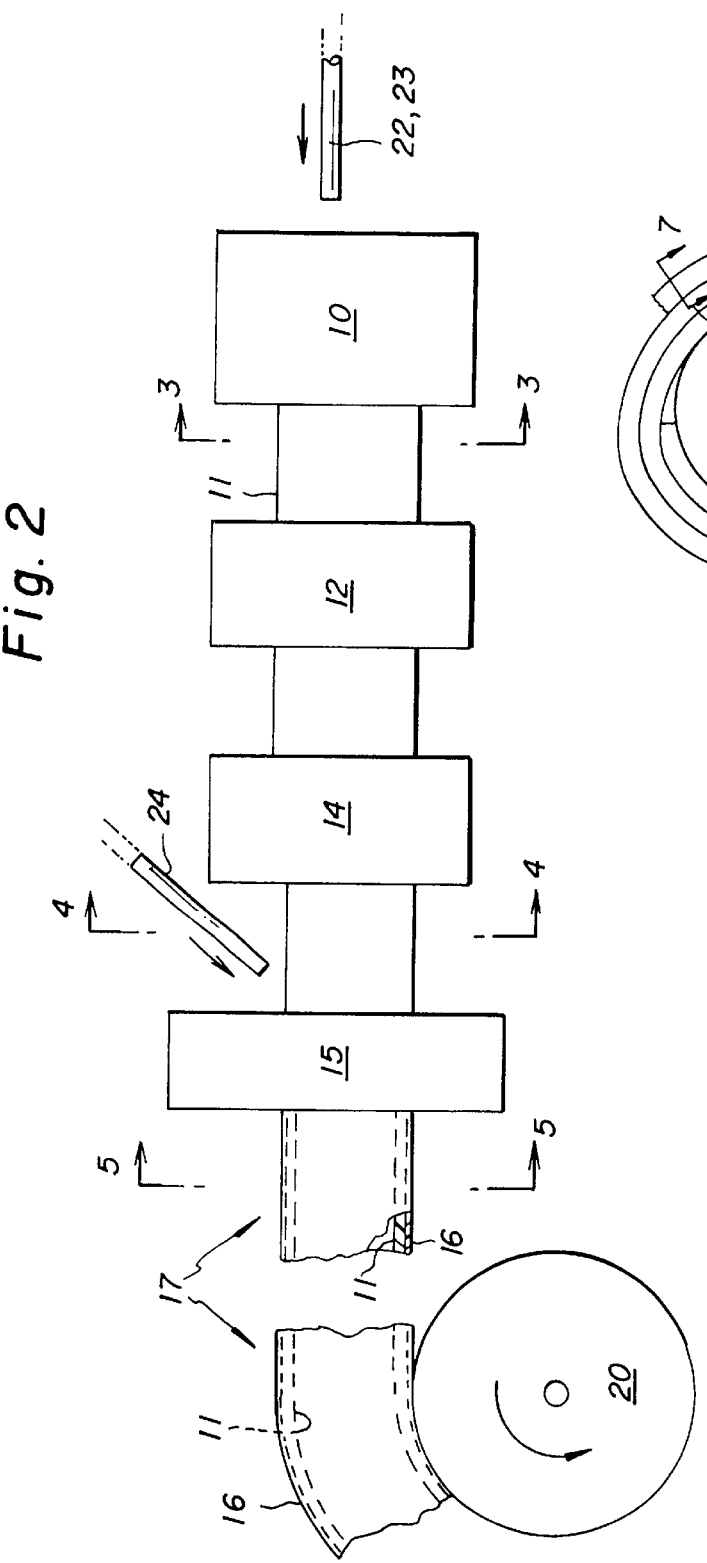
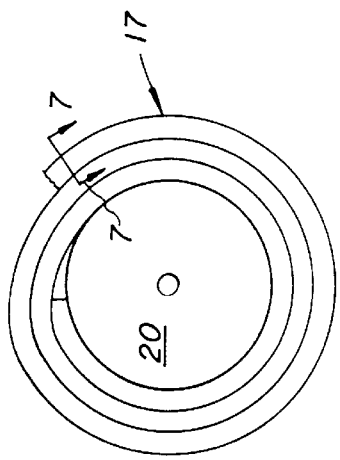

LINING OF UNDERGROUND PIPES

FIELD OF THE INVENTION

This invention relates to lining of underground pipes, and in particular it relates to a new and improved liner and the method and apparatus for making same.

BACKGROUND OF THE INVENTION

Underground pipes such as those used for water mains, gas pipelines, sewers and other service pipes deteriorate over time. It is known to rehabilitate such pipes by inserting therein a thermoplastic liner which is installed within the pipe, referred to as the "host" pipe in a reduced cross section shape and then forced by steam or other pressurized fluid to expand to its original shape, whereat it engages the wall of the host pipe to form a new leaktight passage for the flow of fluids therethrough.

A particular type of liner which has been found advantageous is one which, instead of being self-sustaining, relies on the residual strength of the host pipe. Because such pipes do in fact rely in part on the residual strength of the host pipe, they can be made with thinner walls than those which would be self-sustaining, although they must be of sufficient strength and thickness to securely span any holes in the host pipe, and of course strong enough and thick enough to subsequently perform the intended functions of the host pipe.

Arrangements for forming deformed liners for insertion in host pipes are shown in my prior U.S. Pat. No. 5,318,421 and in my prior European Patent No. 0 787 940 as well as in U.S. Pat. No. 4,207,130, PCT Published Application No. WO 87/03840 and United Kingdom Patent No. 1,580,438.

One of the more important problems associated with the use of a liner in a host pipe concerns protecting the deformed liner prior to and during insertion. Each abrasion which occurs prior and especially during insertion of the liner into the host pipe will limit the ability of the liner to expand within the host pipe and could adversely affect its leaktight integrity.

Several of the above identified patents disclose protecting a deformed liner with a sleeve which surrounds the deformed liner. However, as disclosed in these prior patents, the sleeve includes at least one seam line which provides a weakened location which could adversely affect the structural integrity of the sleeve before or during insertion in the host pipe, thereby exposing the liner itself to abrasions or the like before or during insertion into the host pipe.

Thus, there exists a need for improvements to better protect a deformed liner after it is deformed and then prior to or during insertion of the liner within a host pipe.

BRIEF SUMMARY OF THE INVENTION

It is a purpose of the present invention to provide an improved liner of the type described which is deformed for insertion into a host pipe, together with a method and apparatus for making same, all of which overcome problems which existed in the prior art.

In accordance with the present invention, a deformed liner is, immediately upon deformation thereof, tightly surrounded with a coaxially extruded seamless protective sleeve.

In accordance with a preferred method and apparatus of the present invention, a thermoplastic material such as polyethylene is originally extruded in tubular form after which it is delivered to a deforming structure which may be of any known arrangement including the deforming structure as shown in my U.S. Pat. No. 5,318,421. The deformed liner then exits the deformer at ambient temperature. The extruded liner is preferably cooled after it is extruded and prior to the deforming apparatus. However, it is also possible to include cooling means within the deforming apparatus. As is shown in the prior patents, including my prior U.S. Pat. No. 5,318,421, the liner is deformed by deflecting it along a line running longitudinally along the periphery down into a U-shape which essentially reaches the opposite side of the periphery, leaving two rounded lobes on each side thereof, thereby providing a deformed structure which is generally referred to as heart-shaped. Immediately after such deformation, the deformed liner has some tendency to initially revert towards its original shape. At this moment, i.e., immediately after deformation, the deformed liner is passed through a tubular extrusion apparatus which extrudes a seamless tube coaxial with the liner closely about its periphery. The slight outward movement of the liner at this time will force it tightly against the coaxially extruded tube, which then becomes a high integrity seamless protective sleeve. The combined liner and protective sleeve may then be wound on a drum for transport to a remote location.

In accordance with a preferred embodiment of the present invention, there is provided a deformed heart-shaped liner in combination with a seamless protective sleeve which tightly surrounds the deformed liner, thus holding it in its deformed shape and protecting it against abrasions or the like.

In accordance with another feature of the present invention, ducts may be placed through the liner during the formation thereof. For example water ducts can be inserted therein to facilitate insertion of water to pressurize the liner to cause it to revert to its original shape after it has been inserted into the host pipe. Additionally, ducts may be provided either within the liner or in the U-shaped space between the liner and the sleeve for the passage of fiber optics or other service lines. If inserted between the liner and the sleeve, such ducts will ultimately be located, after reversion of the liner within the host pipe, in a tight space formed between the liner and the host pipe.

Thus, it is an object of the present invention to provide a new and improved liner, in combination with a seamless protective sleeve, for insertion into a host pipe.

It is another object of the present invention to provide an apparatus for providing a new and improved liner and protective sleeve combination.

It is another object of the present invention to provide a method for making an improved liner and seamless protective sleeve combination for insertion into a host pipe.

These and other objects of the present invention will become apparent from the detailed description to follow, together with the accompanying drawings.

BRIEF DESCRIPTION OF THE DRAWINGS

A preferred embodiment of the invention will now be described by way of example with reference to the accompanying drawings, wherein:

FIG. 2 illustrates the method and apparatus of the present invention, with various apparatus components shown diagrammatically;

FIG. 6 illustrates schematically the formed sleeved pipe lining wound onto a drum;

DETAILED DESCRIPTION OF THE INVENTION

Figure 1:
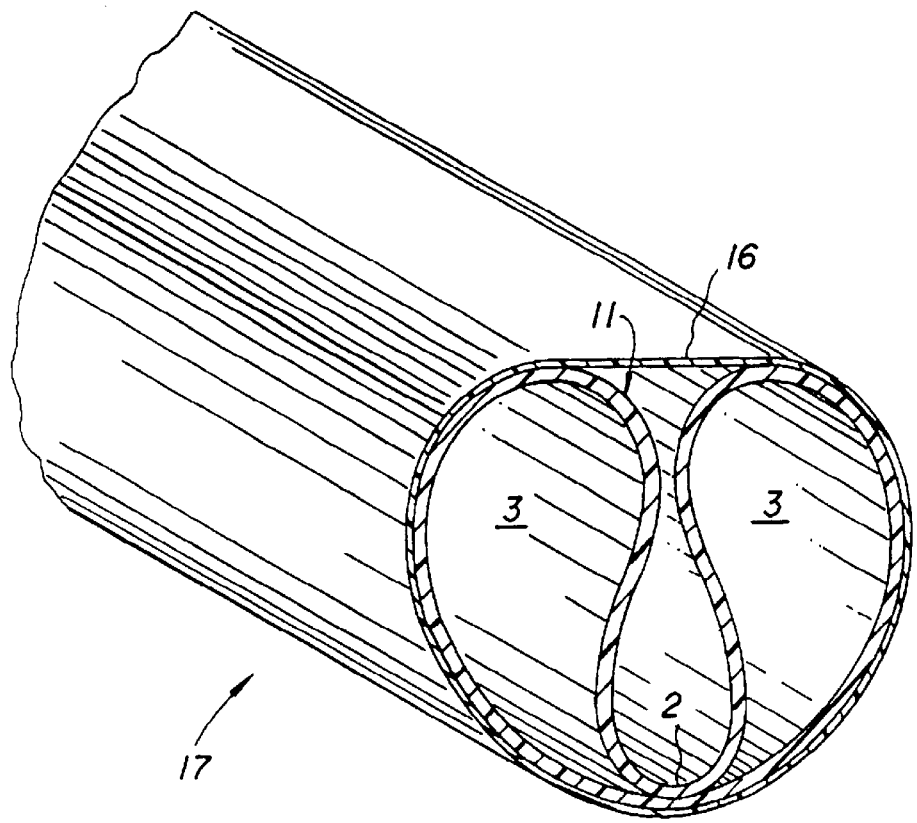
FIG. 1 is a perspective view taken through a section line of a combined liner and protective sleeve of the present invention.

Referring now to the drawings, like elements are represented by like numerals throughout the several views.

FIG. 1 illustrates a combined liner and protective sleeve 17 made in accordance with the present invention. After initial extrusion of the liner 11 in cylindrical form, it is deformed to the shape shown in FIG. 1 having a U-shaped indentation 2 and rounded side lobes 3, wherein the shape of the deformed liner is referred to generally as heart-shaped. A seamless protective sleeve 16 surrounds the deformed liner 11, holding it in its deformed shape and protecting it against abrasions and the like either before or during insertion of the liner and protective sleeve into a host pipe.

The liner 11 is preferably made of polyethylene, but it may be made of other thermoplastic materials. The protective sleeve 16 is also preferably made of polyethylene but may also be made of other materials. In a preferred embodiment, the liner 11 is a "thin wall" liner because instead of it being self-sustaining, it is normally intended to be urged against the interior surface of a host pipe so as to combine its. strength with the residual strength of the host pipe, wherein the two in combination will provide a rehabilitated pipe with adequate strength and which is leak-tight. For leak-tightness, it is important that the material of liner 11, while thin enough to require supplementing its strength with the residual strength of the host pipe, must also be strong enough to span the holes, cracks or the like in the host pipe so that the material of the liner does not rupture while spanning these holes, cracks or the like so that the liner retains its structural and leak-tight integrity. Although the invention is particularly advantageous for use with thin wall liners, it is to be understood that the features of the invention are also advantageously applicable to liners having a greater, self-sustaining thickness.

The thickness of the sleeve must be chosen so that it is strong and durable enough to prevent imperfections within the host pipe from reaching and abrading the exterior surface of the liner 11. On the other hand, the protective sleeve 16 must be thin enough, especially as a continuous extrusion without a weakened seam, to burst when steam or pressurized water, other fluid or air within the interior of liner 11 is made great enough to cause the liner 11 to burst through the sleeve 16 to be restored to its original rounded shape.

After a liner is restored to its original shape by pressurizing with steam, air or other liquid within the liner 11, and after bursting through its protective sleeve 16, the liner can either be slightly smaller, equal to or slightly larger than the inside diameter of the host pipe. If slightly larger, it will tend to be circumferentially compressed against the interior of the host pipe. However, if the liner is slightly smaller, there would be a considerable cost saving if a slightly smaller liner could be expanded past its original shape and into engagement with the interior of the host pipe. In fact, the less the abrasions in the liner, the more it can be expanded past its original shape. Thus, for an abrasion-free liner made from a polymeric material, which can exist in the present invention even after the liner has been fully inserted into its host pipe, the liner can be expanded up to 10% beyond its original diameter. Thus, as an example, avoidance of abrasion in the liner of the present invention which strongly enhances the chances of minimal or zero abrasions in the liner can result in the considerable cost saving of using a pipe which in its original state, i.e., prior to deformation, is slightly less than the inside diameter of the host pipe.

Any polymeric pipe material capable of withstanding the necessary pressures without damage could be used. The liner pipe SDR (diameter to wall thickness ratio) is generally in the range of 17 to 60 for polyethylene 80 classification pipe. A "thin wall" polymeric or plastic pipe could be defined as one that would not be directly buried because it would not be capable of sustaining the internal conveyed product pressure and/or the external ground pressure without other support. The point at which a pipe with a specific SDR would be self-sustaining would depend on the working pressures under normal operating conditions. Generally, however, a thicker wall, self-sustaining liner would have an SDR of up to 26.

The sleeve 16 could be of any polymeric material of low friction that can be co-extruded over the liner 11, offering the necessary protection against abrasion in the sleeved deformed pipe. It has been found that a sleeve thickness of between 0.3 mm and 0.8 mm is generally adequate. The precise thickness would depend on the size and SDR of the deformed pipe being sleeved, but a specific sleeve wall thickness could cover a range of SDRs.

The outside diameter of the liner pipe (before deformation) relative to the inside diameter of the host pipe is exemplified by the following table:

| Host Pipe Nominal Bore | Host Pipe ID Range (mm) | Liner Outside Diameter (mm) | Liner Wall Thickness (mm) |
| --- | --- | --- | --- |
| 4" | 100.0–107.0 | 100.0 | 3 |
|  | 94.5–100.5 | 94.5 | 3 |
| 6" | 153.0–163.7 | 153.0 | 3 |
|  | 144.0–154.0 | 144.0 | 3 |
| 8" | 200.0–214.0 | 200.0 | 4 |
|  | 188.0–201.0 | 188.0 | 4 |
| 10" | 248.0–266.0 | 248.0 | 5 |
| 12" | 296.0–317.0 |  | 6 |

Prior to insertion and reversion, the cross sectional area of the sleeved deformed liner will have been reduced by the deformation process to approximately 60% of that of the original undeformed liner (and also, therefore, 60% of the host pipe inside diameter). Appropriate selection of the diameter of the liner 11 for a given host pipe inside diameter and application of reversion pressures and the conveyed product pressure when in use ensures that the liner obtains as close a fit as possible to the inside wall of the host pipe. The protective sleeve 16 allows for greater over-expansion of the liner pipe because the pipe is abrasion free and therefore greater variation in the inside diameter of the host pipe can be covered by a single size of liner 11. For example when the invention is implemented on the basis of a PE liner pipe 11, an expansion of up to 10% is possible and would achieve the requisite close fit (as compared to a maximum expansion of up to 6% for corresponding unprotected, unsleeved liners.

In the present invention, the protective sleeve 16 is not adhered at any point to the exterior surface of the liner 11. This provides the advantage that it allows both the sleeve 16 and the restrained liner 11 to move relative to each other to give more flexibility in negotiating tighter bends during the insertion process. Also, during expansion a non-adhered sleeve allows the liner 11 to expand uniformly about its circumference. An adhered liner would, on the other hand, promote non-uniform expansion of the liner during reversion and hinder the ability to make satisfactory connections to the liner after reversion (for example ferrule connections for customer service take-offs).

It is also possible to bring the liner 11 to the deformer in the form of a spool which is fed directly into the deformer. In this case, of course the liner 11 would already have been cooled prior to having been spooled. While this is a possibility, it is not preferred since it is generally preferred in practice to extrude the liner 11 directly into the deforming apparatus, preferably after a cooling bath.

If in fact the liner 11 is extruded from extruder 10, as preferred, it is next cooled. The cooler is preferably a tank or bath of flowing water through which the extruded pipe passes following extrusion, but it also may be a spray as shown in U.S. Pat. No. 4,207,103. The normal process is to complete cooling prior to the deformer so that deformation is carried out at ambient temperature. However, it is also possible to deform the liner 11 while hot, followed by cooling downstream therefrom, either before or after the subsequent coaxial extrusion. The sleeve 16 thereon would definitely be cooled prior to being wound on a drum. To reiterate, following the preferred method and apparatus, the liner 11 will have been cooled at cooling apparatus 12 downstream from extruder 10 and prior to the deformer 14.

Figure 3:
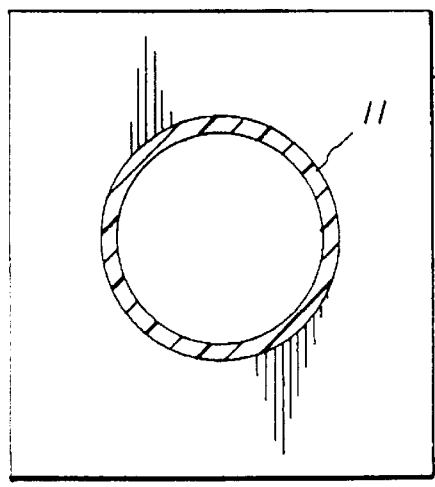
FIG. 3 is a cross sectional view taken along line 3—3 of FIG. 2.
Figure 4:
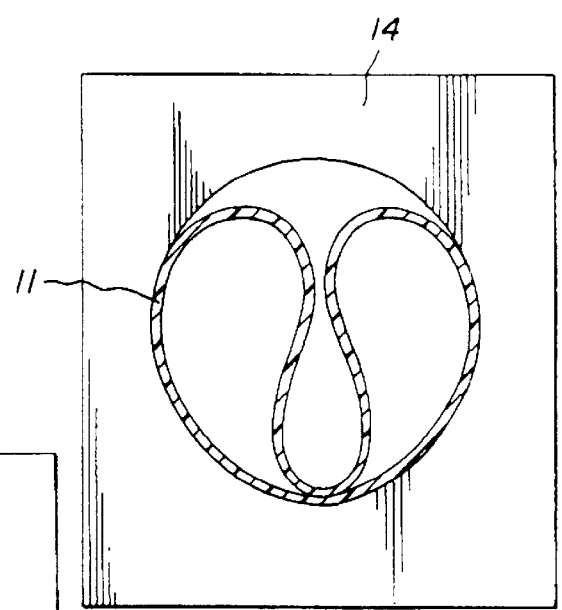
FIG. 4 is a cross sectional view taken along line 4—4 of FIG. 2.
Figure 5:
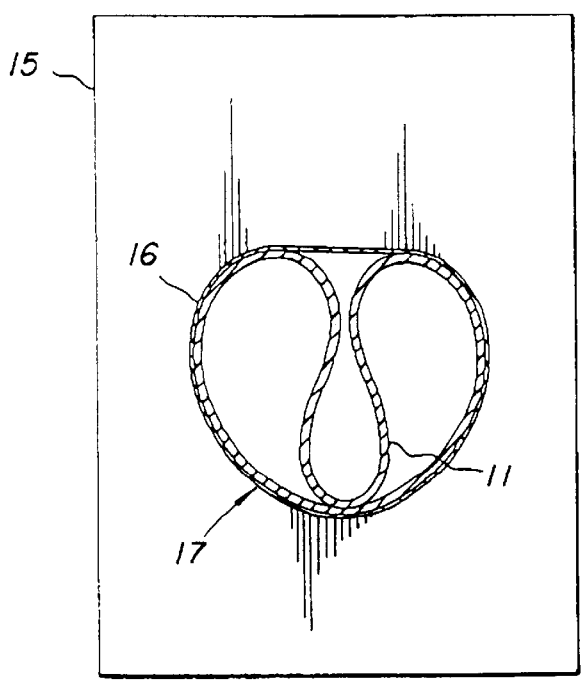
FIG. 5 is a cross sectional view taken along line 5—5 of FIG. 2.

The method and apparatus for forming the combined liner and protective sleeve of FIG. 1 will be explained with reference to FIGS. 2–8. Referring to FIG. 2, an extruder 10 of conventional design extrudes a tubular liner 11 as shown in FIG. 3. The liner is then preferably cooled in cooler 12 after which it is deformed in liner deformer 14 to the form as shown in cross section in FIG. 4. After deformation, the deformed liner is passed through the center of a coaxial extruder 15 which extrudes a tubular sleeve 16 about the liner 11, forming the combined deformed sleeved liner 17 as shown in FIG. 5 and as also shown in FIG. 1. At this point, the liner has the U-shaped indentation 2 and the lobes 3 which give it its overall heart-shape.

The deformer 14 might be of any suitable known construction for deforming a liner, including for example the structure shown in my previous U.S. Pat. No. 5,318,421.

Liners for rehabilitating pipes are either formed onsite or formed offsite and wound on a drum or the like for transport to a remote work site location. An advantage of onsite immediate use of the liner is the avoidance of the costs of transporting the finished liner. A disadvantage of forming a liner onsite is that it requires taking the relatively heavy forming equipment to the site. Thus, in many cases it might be far more beneficial to wind the completed sleeved liner 17 onto a drum for transport to a remote location. For several reasons, the present invention lends itself to the latter use, i.e., being wound on a drum for transport to a remote location. First, the equipment itself would be quite heavy and cumbersome, whether it used only the coaxial extruder 15 (together with a liner 11 which was fed from a spool) or the two extruders 10 and 15 together with the deformer 14. Also, since the present invention provides such excellent protection for the liner against abrasions during transport to a remote location, the present invention lends itself particularly well to the latter application of winding the finished sleeved liner onto a drum.

FIG. 2 therefore illustrates schematically the winding of the finished sleeved liner 17 onto a drum 20. An extensive length of the sleeved liner 17 wound onto the drum 20 is schematically illustrated in FIG. 6.

Figure 7:
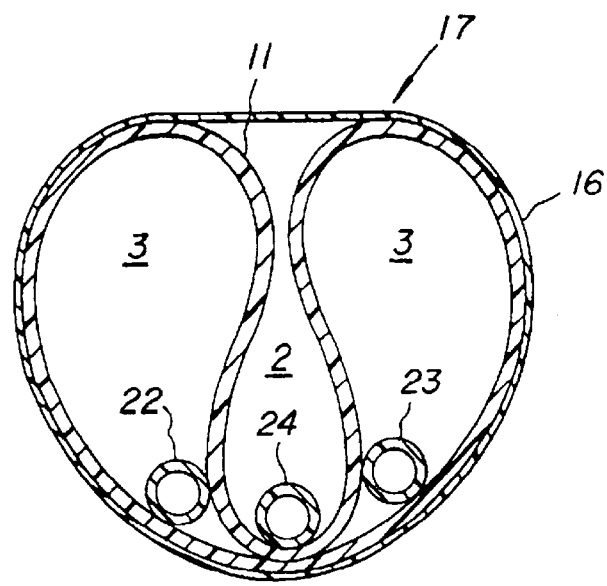
FIG. 7 is an enlarged cross sectional view of the sleeved pipe lining, shown along line 7—7 of FIG. 5 and illustrating modifications.

FIG. 7 is a cross sectional view of the sleeved liner 17 similar to FIGS. 1 and 5, but illustrating modifications of the present invention. Since the liner 11 is within a completely protective sleeve 16, it is possible to provide ducts through the sleeve. Ducts 22 and 23 show locations for ducts within the interior of the liner 11. These can be used for transmission of pressurized fluid to expand the liner 11 back to its original shape or as any type of service line through the pipe, especially for fiber optic lines. Also, a duct 24 can be provided at a location within the sleeve 16 that is exterior of the liner 11. This duct could be used for transmission of fiber optic lines but not pressurizing fluid for expanding the pipe 11 back to its original state.

Figure 8:
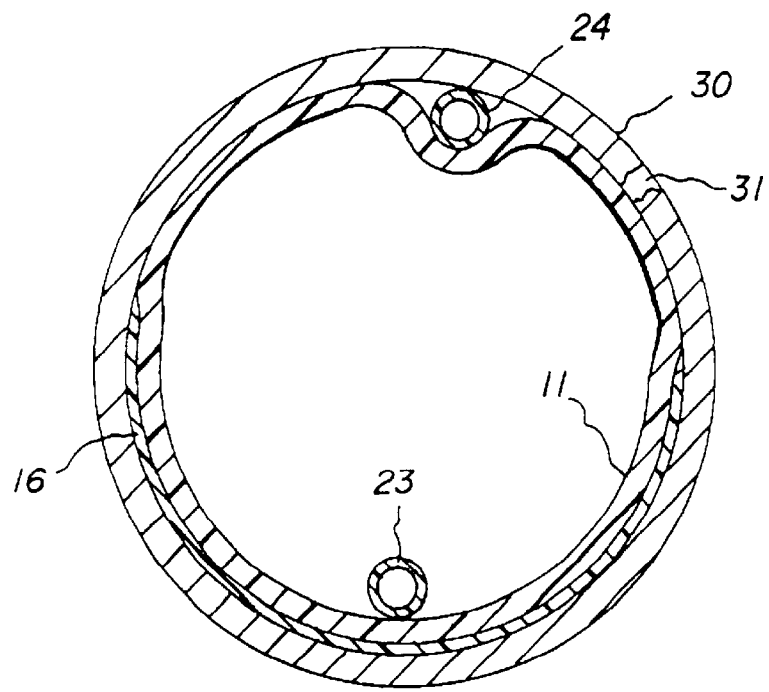
FIG. 8 is an enlarged view showing the sleeved pipe lining of FIG. 7, after it has been restored to its original tubular condition within a host pipe.

FIG. 8 illustrates the liner 11 fully expanded against the interior of host pipe 30. Also illustrated therein is a duct 23 within the liner 11 and an external duct 24 which would end up squeezed between the liner 11 and the wall of the host pipe 30. Here, the sleeve 16 is illustrated as only partially surrounding the liner 11 because of course upon expansion of liner 11, it bursts through the sleeve 16 and in its expanded state occupies a larger circumference than does the sleeve 16.

Host pipe 30 will generally be of a relatively strong construction such as steel, cast iron or the like which has significant residual strength, even in its deteriorated state. While the liner pipe 11 might not be strong enough to stand on its own, the combination of liner 11 with the residual strength of host pipe 30 definitely provides a rehabilitated pipe of sufficient strength and complete leak-tight integrity. FIG. 8 also illustrates one imperfection in the form of a hole 31 in the host pipe 30. The liner 11 must be of sufficient strength to span this opening and not rupture when pressurized over this opening. The present invention is advantageous in this regard in that it assures that the portion of liner 11 overlying the imperfection 31 will not have defects such as abrasions or the like.

A duct within the liner 11 such as duct 22 or 23 would have to be added prior to extrusion of the liner 11 at extruder 10, as illustrated at 22,23 in FIG. 2. Of course if the liner 11 were brought to the apparatus of FIG. 2 on a spool rather than extruded at 10, the ducts 22,23 would already have been inserted or formed therein. A duct 24 between the liner and the sleeve would have to be delivered after the deformer 14 and before the sleeving extruder 15 as shown at 24 in FIG. 2.

Although the invention has been described in detail with respect to preferred embodiments thereof, it will be apparent to one skilled in the art that the invention is capable of numerous modifications and variations within the spirit and scope of the invention.

What is claimed is:

1. A method of forming a pipe liner comprising the steps of:

providing a continuous length of tubular pipe liner, deforming the extruded liner by forcing a perimeter of the pipe liner into and past the central axis of the tubular pipe liner to form a U-shaped indentation and wherein the deformed pipe liner has a total cross section which is smaller than its original cross section prior to the deforming step, and coaxially extruding a continuous tubular protective sleeve around the deformed pipe liner, the extruded sleeve being of a strength sufficient to hold the deformed pipe liner in its deformed state.

2. The method of claim 1, wherein the pipe liner is made of polyethylene, plastic or other polymeric material and the sleeve is made of polyethylene, plastic or other polymeric material.

3. The method of claim 1, wherein the providing step includes extruding the continuous length of tubular pipe liner directly prior to the deforming step.

4. The method of claim 3, including cooling the tubular liner after extrusion and prior to deformation.

5. The method of claim 3, including cooling the tubular liner during or after the deforming step.

6. The method of claim 1, including the step of introducing a duct through the sleeve.

7. The method of claim 6, including inserting the duct along the interior of the deformed pipe liner.

8. The method of claim 6, including inserting the duct between the deformed pipe liner and the protective sleeve.

9. The method claim 1, including winding the combined pipe liner and protective sleeve on a drum.

10. An apparatus for forming a pipe liner comprising:

means for providing a tube of pipe liner material, a deforming structure for deforming the pipe liner into a heart-shape, and a coaxial extruder for extruding a tubular protective sleeve co-axially around the deformed pipe liner and in tight holding engagement with the deformed pipe liner.

11. An apparatus according to claim 10, wherein the means for providing comprises an extruder for extruding a tube of pipe liner material for delivery directly to the deforming structure.

12. An apparatus according to claim 11, including a cooling structure positioned between the extruder and the deforming structure to cool the extruded pipe liner material before it is received by the deforming structure.

13. An apparatus according to claim 10, including means for winding the combined pipe liner and protective sleeve on a drum.

14. An apparatus according to claim 11, including means for placing a duct within the sleeve.

15. An apparatus according to claim 13, including means for placing a duct within the pipe liner.

* * * * *